United States Patent [19]

Miyatake

[11] Patent Number: 4,753,519

[45] Date of Patent: Jun. 28, 1988

[54] OPTICAL SYSTEM FOR PROJECTION TELEVISION APPARATUS

[75] Inventor: Yoshito Miyatake, Neyagawa, Japan

[73] Assignee: Matsushita Electric Industrial Co., Ltd., Osaka, Japan

[21] Appl. No.: 780,680

[22] Filed: Sep. 26, 1985

[30] Foreign Application Priority Data

Sep. 27, 1984 [JP] Japan .................................. 59-202516
Oct. 16, 1984 [JP] Japan .................................. 59-216738

[51] Int. Cl.$^4$ ...................... G02B 13/18; G02B 27/00; H04N 5/72
[52] U.S. Cl. ................................. 350/432; 350/571; 358/250
[58] Field of Search ............... 350/571, 412, 432, 255; 358/250, 225, 227, 64, 231; 353/100, 102, 103

[56] References Cited

U.S. PATENT DOCUMENTS

| | | | |
|---|---|---|---|
| 1,848,402 | 10/1929 | Wollensak | 350/255 |
| 3,972,584 | 8/1976 | Lobb | 350/571 |
| 4,051,513 | 9/1977 | Takeuchi et al. | 358/64 |
| 4,300,817 | 11/1981 | Betensky . | |
| 4,348,081 | 9/1982 | Betensky . | |

FOREIGN PATENT DOCUMENTS 58-136011 8/1983 Japan .
58-194234 11/1983 Japan .

Primary Examiner—John K. Corbin
Assistant Examiner—Ronald M. Kachmarik
Attorney, Agent, or Firm—Wenderoth, Lind & Ponack

[57] ABSTRACT

An optical system for projection television apparatus has three projection cathode-ray tubes for producing red, green and blue monochrome images, respectively. Three projection lens systems are disposed in front of faceplates of the projection cathode-ray tubes, respectively for producing the red, green and blue screen, each of the projection lens systems having a rear lens element having a negative power and disposed in front of a corresponding one of the cathode-ray tubes and a front group having a positive power and disposed in front of the rear lens element, the rear lens element having a concave surface facing the front group. In each of at least two of the three projection lens systems, the optical axis of the front group is tilted to that of the rear lens element, and the optical axis of the rear lens element is in parallel with or aligned with that of the corresponding one of the projection cathode-ray tubes.

12 Claims, 8 Drawing Sheets

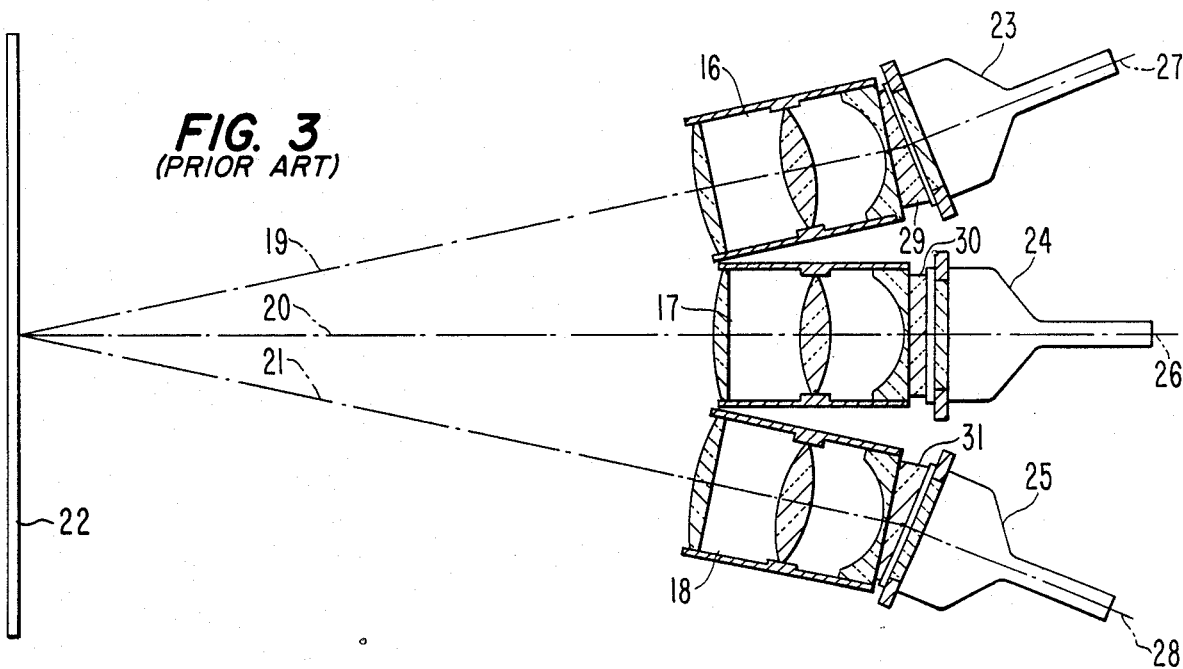
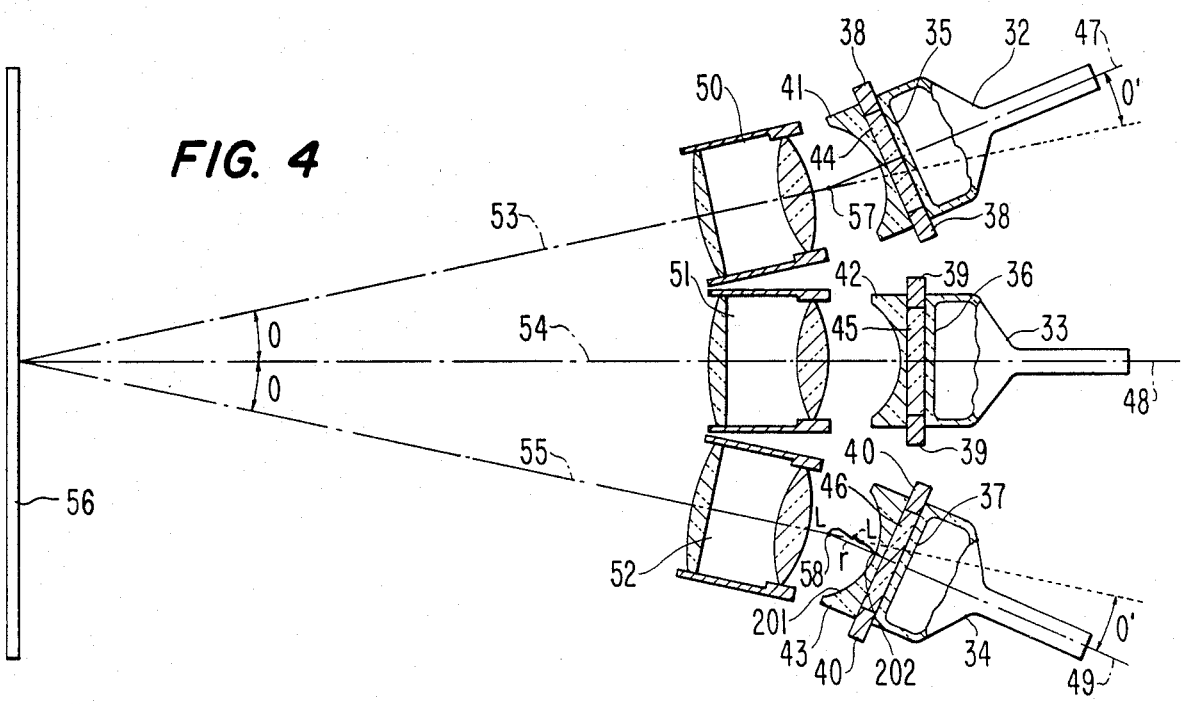

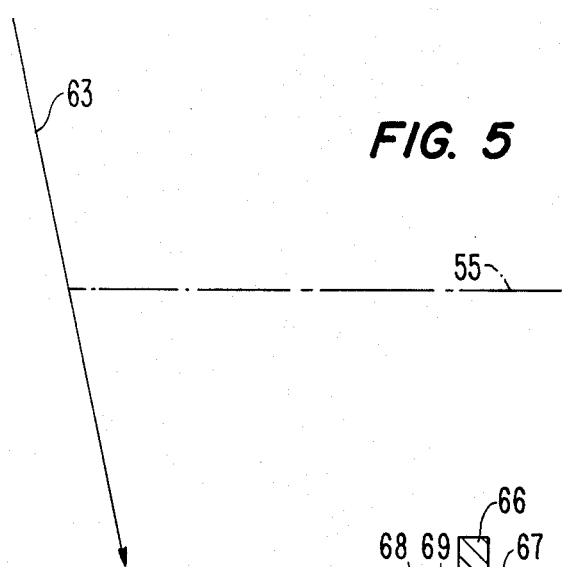
FIG. 5
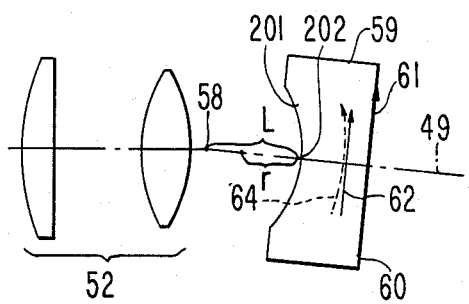
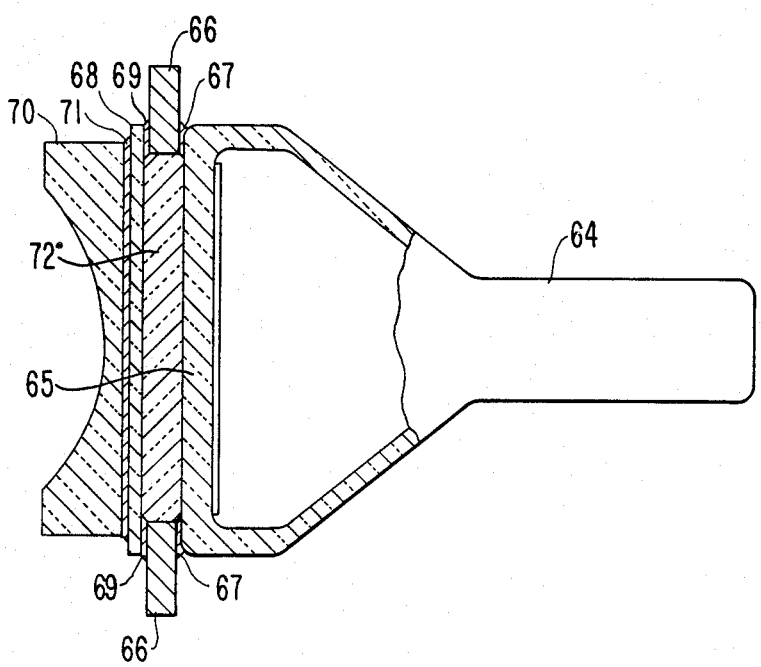
FIG. 6
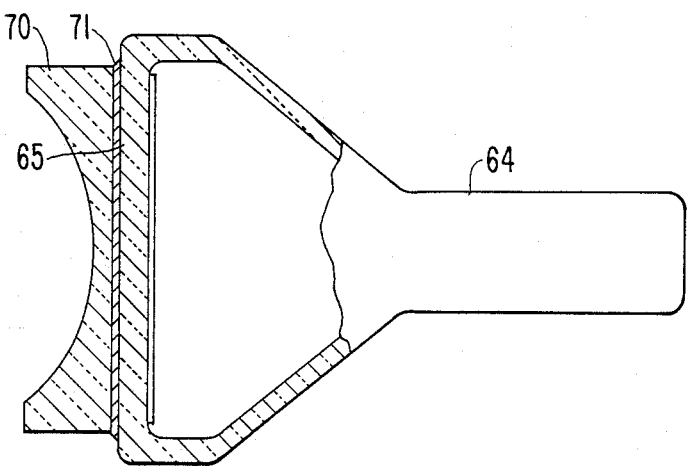
FIG. 7

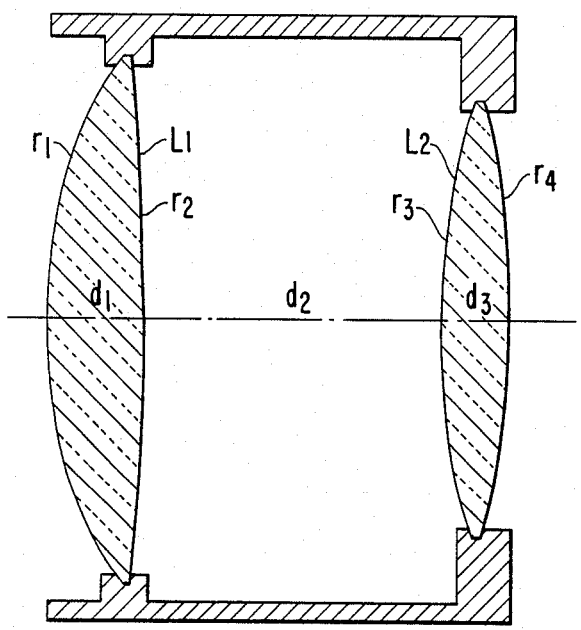
FIG. 10
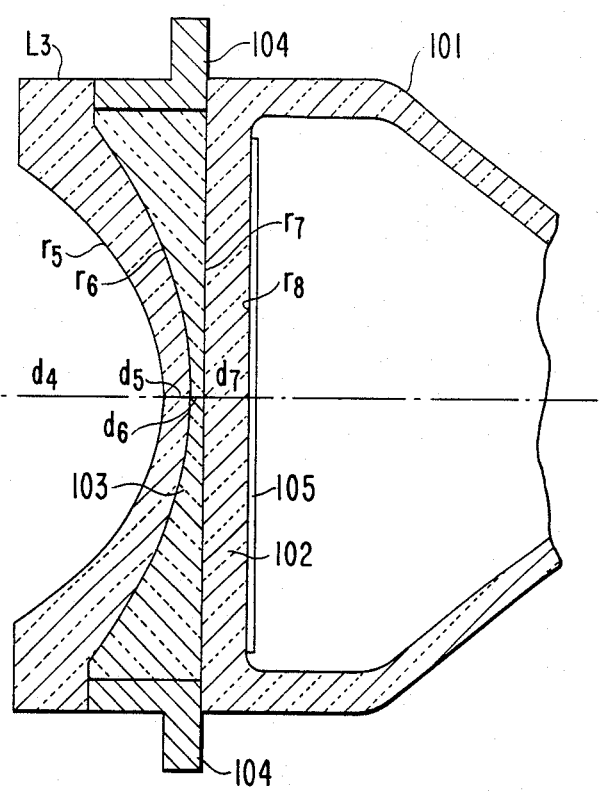
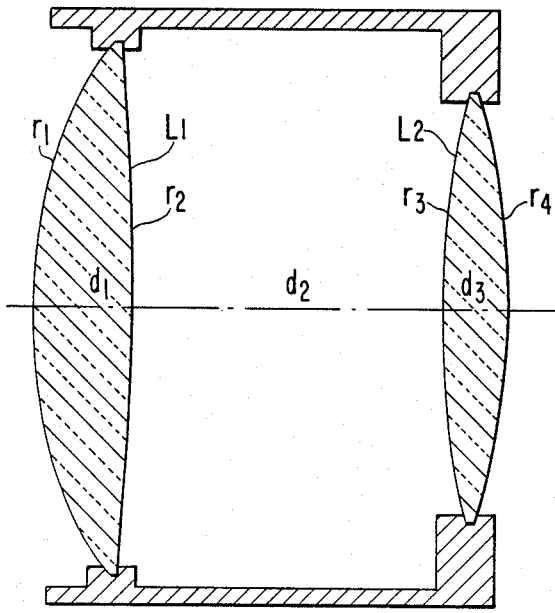
FIG. 11
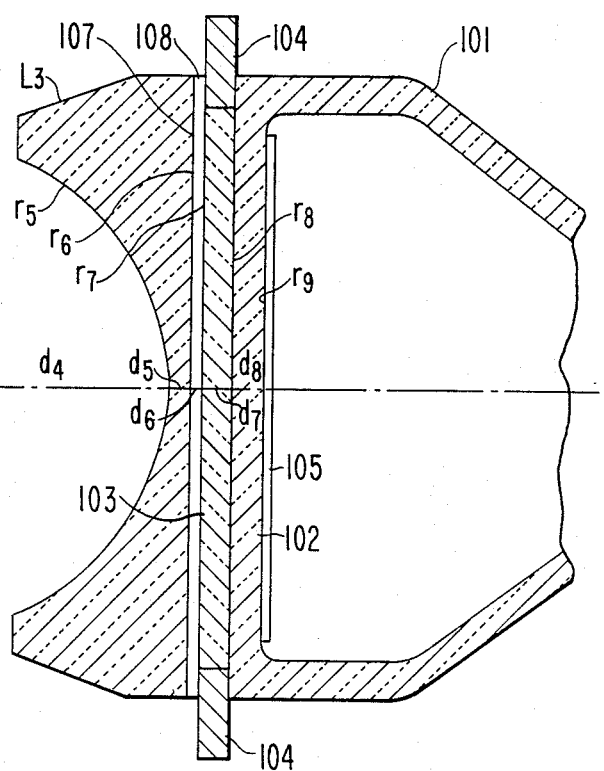

OPTICAL SYSTEM FOR PROJECTION TELEVISION APPARATUS

BACKGROUND OF THE INVENTION

1. Field of the Invention

The present invention relates to a projection television apparatus for enlarging and projecting on a large-size screen an image formed on the fluorescent screen of a projection cathode-ray tube and more particularly to a projection television apparatus capable of projecting a high contrast image.

2. Description of the Prior Art

In order to obtain a large-size television image, there has been devised and demonstrated a system in which an image formed on the fluorescent screen of a projection cathode-ray tube is enlarged and projected on a large-size screen by means of a projection lens. In this system, since it is desired that the image projected on the screen be as bright as possible, it is required that the projection cathode-ray tube produce an intensely bright image and it is necessary to employ a bright projection lens.

In order to produce an intensely bright image, there has been devised and demonstrated a liquid-cooled projection cathode-ray tube as shown in FIG. 1. In this liquid-cooled projection cathode-ray tube, a metal plate 3 with a center aperture is securely bonded with an adhesive 4 to the faceplate 2 of a projection cathode-ray tube 1, and a glass plate 5 is securely bonded with an adhesive 6 over the metal plate 3. A transparent liquid 7 which has good heat convection properties is sealed into a closed space defined by the faceplate 2, the metal plate 3 and the glass plate 5. The heat transmitted from the faceplate 2 is further transmitted to the metal plate 3 by the convection of the transparent liquid 7 and is dissipated into the surrounding atmosphere from the surface of the metal plate 3, whereby the faceplate 2 is cooled. As a result, even when the driving power is increased, the liquid-cooled projection cathode-ray tube can avoid likelihood of explosion and produce an intensely bright image.

On the other hand, there have been known bright projection lenses with F1.0 consisting of six glass lens elements. Also, U.S. Pat. Nos. 4,300,817 and 4,348,081 disclose a projection lens which consists of three lens elements made of acrylic resin and which has an aspheric surface. When the lens elements are all made of plastic, the image plane is shifted due to variation in ambient temperature because the temperature dependence of plastic lenses is ten times larger than that of glass lenses. As a result, the image is out of focus, resulting in a convergence error. In order to overcome the above described problem, a hybrid lens consisting of three lens elements made of glass and plastic is disclosed in Japanese Laid-Open Patent Application No. 58-125007. Furthermore, Japanese Laid-Open Patent Application No. 58-181009 discloses a projection lens system which is combined with a projection cathode-ray tube whose luminescent screen is convex so as to make easy the correction of the image plane distortion, to improve aberrations, and to increase the relative aperture and the view angle.

As described above, the performance of the projection cathode-ray tube and the projection lens system have been improved, but there still remains the serious problem that the contrast of the projected image is not satisfactory. To overcome this problem, Japanese Laid-Open Patent Application No. 58-194234 disclosed a system as shown in FIG. 2. In this system, a transparent medium 12 whose index of refraction is substantially equal to those of the faceplate 9 of a projection cathode-ray tube 8 and the lens element 11 of a projection lens system 10 adjacent to the faceplate 9 is interposed between the faceplate 9 and the lens element 11, whereby contrast is improved. The projection lens system 10 is substantially similar in construction to the above-described projection lens consisting of three lens elements. The lens element 11 is therefore a planoconcave lens element whose concave surface is oriented toward the screen.

When the outer surface 13 of the faceplate 9 is flat and in contact with the air, a part of the light emitted from a point on a fluorescent screen 14 is reflected by the outer surface 13 and returns to the fluorescent screen 14 at the same angle as the angle at which the light is incident on the outer surface 13. The fluorescent screen 14 is substantially a complete diffusion reflection surface so that the light returned to the luminscent screen 14 is diffused and reflected to directed as unwanted light toward the projection lens system 10. The unwanted light is spread all over the screen, resulting in the decrease in contrast of the whole projected image. In the system as shown in FIG. 2, since the lens element 11 is a planoconcave lens whose concave surface is oriented toward the screen and the difference in index of refraction at the boundaries between the fluorescent screen 14 and the concave surface 15 is very little, the outer surface of the faceplate may be regarded as a concave surface. In this system, the light emitted from a point on the fluorescent screen 14 is diverged by the concave surface 15. In this case, the angle of divergence becomes greater than that prior to the reflection so that the illuminance of the light returned to the fluorescent screen 14 becomes smaller as compared with the case in which the outer surface 13 of the faceplate is in direct contact with the air. As a result, the contrast of the projected image is considerably improved as compared with the prior art projection television systems.

It is now apparent that if the liquid-cooled projection cathode-ray tube as shown in FIG. 1 and the projection lens system as shown in FIG. 2 and capable of improving contrast are combined, there may be provided a projection television apparatus which can project on a large screen an intensely bright image with a high degree of contrast. In the case of the recent mainstream projection television apparatus or receivers, red, green and blue optical systems are used to produce a color image on a screen. As a result, the arrangement as shown in FIG. 3 is used to project an intensely bright image with a high degree of contrast. Projection cathode-ray tubes 23, 24, 25 and projection lens systems 16, 17 and 18 are arranged in line so that the optical axes 19, 20 and 21 of the projection lens systems 16, 17 and 18 converge at one point on a screen 22. The optical axis 26 of the center green-image projection cathode-ray tube 24 can be aligned with the optical axis 20 of the projection lens system 17, but the axes 27 and 28 of the outer red-image and blue-image projection cathode-ray tubes 23 and 25 must be inclined at an angle with respect to the axes of the projection lens systems 16 and 18, respectively. The reason is that the red and blue images are projected at an angle on the screen 22 so that the deflection adjustments of the red and blue optical systems are required. Therefore the angle between the optical axes 27 and 28 of the red-image and blue-image projection cathode-ray tubes 23 and 25 becomes greater than the angle between the optical axes 19 and 21 of the projection lens systems 16 and 18.

When the air is filled in space between the projection lens system and the projection cathode-ray tube, there arises no problem even when the optical axis of the projection cathode-ray tube is inclined with respect to the optical axis of the projection lens system. But when the projection lens system and the projection cathode-ray tube cannot be spaced apart from each other as shown in FIG. 3, there arises a very serious problem. In the arrangement as shown in FIG. 3, transparent media 29, 30 and 31 must be interposed between the projection lens systems 16, 17 and 18 on the one hand and the projection cathode-ray tubes 23, 23 and 25 on the other hand so as to eliminate the air layers therebetween. Furthermore the transparent media 29, 30 and 31 are different in shape from each other. It is considered that when a projection television receiver or apparatus is assembled, a transparent media is in the liquid phase, but when the receiver or apparatus is operated, it is gel or solid. The reason is that in order to eliminate the air layer completely in assembly, the transparent media must be in the liquid phase. As a consequence, there must be provided parts which define and maintain a predetermined positional relationship between the projection lens system and the projection cathode-ray tube and which also serve to seal a transparent medium therebetween. These parts are of course very expensive and at least two types of parts are required because both the surfaces of the part used in the green optical system are flat or in parallel with each other while the parts which are used in the red and blue optical systems have surfaces which are not in parallel with each other. Furthermore, it is difficult to fabricate a part whose surfaces are not in parallel with each other. In addition, it is difficult to assemble it. As a result, the arrangement as shown in FIG. 3 becomes inevitably expensive.

SUMMARY OF THE INVENTION

A primary object of the present invention is therefore to provide a projection optical system which can project an intensely bright image with a high degree of contrast and which is inexpensive to manufacture.

Another object of the present invention is to provide a projection optical system in which the correction of various aberrations is satisfactorily made and which has a resolution which is satisfactory in practice.

In a projection television apparatus in accordance with the present invention, there are provided three projection cathode-ray tubes which display red, green and blue monocolor images, respectively, and three projection lens systems respectively disposed in front of faceplates of the three projection cathode-ray tubes. Each projection lens system comprises a rear lens element disposed in front of the projection cathode-ray tube and a front lens element spaced depart from the rear group forwardly. Transparent media are respectively interposed between the three rear lens elements and the corresponding projection cathode-ray tubes so that air layers do not exist therebetween. The three front groups are so arranged that their optical axes converge at one point. In each of at least two projection lens systems, the optical axes of the front group and the rear lens element are not aligned relative to each other. The axes of the three rear lens elements are aligned with the optical axes of the corresponding projection cathode-ray tubes. Therefore, according to the present invention, parts having the same structure can be used to interconnect the rear lens elements and the corresponding projection cathode-ray tubes. In addition, images can be projected on a screen with a high contrast.

The above and other objects, features and advantages of the present invention will become more apparent from the following description of some preferred embodiments taken in conjunction with the accompanying drawings.

BRIEF DESCRIPTION OF THE DRAWINGS

FIG. 3 is a schematic side sectional view of a conventional projection optical system designed to attain high contrast, FIG. 4 is a schematic side sectional view of an embodiment of a projection optical system according to the present invention;

FIG. 5 is a diagram to explain the principle of the present invention;

FIG. 6 is a side sectional view of an embodiment of a projection cathode-ray tube according to the present invention;

FIG. 7 is a side sectional view of another embodiment of a projection cathode-ray tube according to the present invention;

FIG. 10 is a side sectional view of another embodiment of a lens system of a projection optical system according to the present invention;

FIG. 11 is a side sectional view of a further embodiment of a lens system of a projection optical system according to the present invention.

DESCRIPTION OF THE PREFERRED EMBODIMENTS

Figure 1:
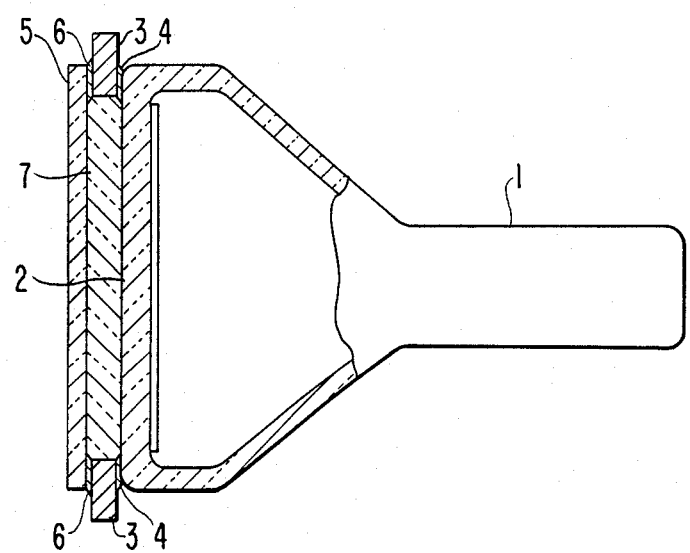
FIG. 1 is a schematic side sectional view of a liquid-cooled projection cathode-ray tube related to the present invention.
Figure 2:
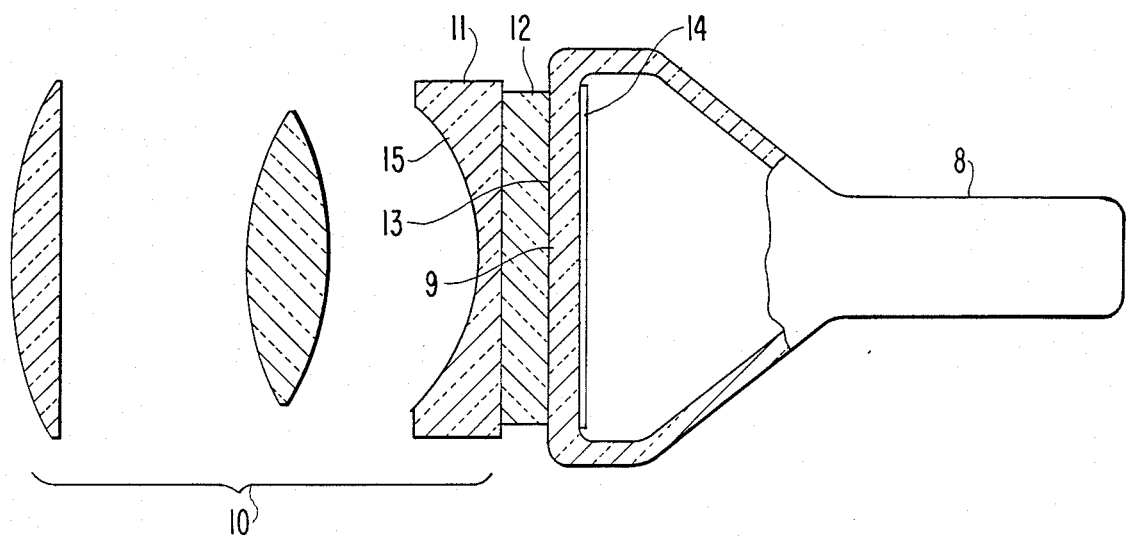
FIG. 2 is a schematic side sectional view of a conventional projection optical system designed in order to improve the contrast of the projected image.

The preferred embodiments of the projection television apparatus in accordance with the present invention will be described with reference to the accompanying drawings.

FIG. 4 shows a first embodiment of the present invention. Metal plates 38, 39, 40 each having a center aperture are securely bonded to faceplates 35, 36 and 37, respectively, of red-image, green-image and blue-image projection cathode-ray tubes 32, 33 and 34. Planoconcave lenses 41, 42 and 43 are securely bonded to the metal plates 38, 39 and 40, respectively, in such a way that the concave surfaces of the lenses 41, 42 and 43 are directed in the direction opposite to the projection cathode-ray tubes 32, 33 and 34. Transparent liquid is filled into closed spaces 44, 45 and 46 defined between the faceplates 35, 36 and 37 on the one hand and the planoconcave lenses 41, 42 and 43 on the other hand. The projection cathode-ray tubes 32, 33 and 34 are arranged in line so that their optical axes 47, 48 and 49 converge at a point in front of the face plates 35, 36 and 37. Front groups 50, 51 and 52 each consisting of two lens elements are disposed in front of the planoconcave lenses 41, 42 and 43, respectively. The planoconcave lenses 41, 42 and 43 constitute rear lens elements respectively, and one projection lens system comprises one rear lens elements and one front group.

The front groups 50, 51 and 52 are arranged in line so that their optical axes 53, 54 and 55 converge at one point on a screen 56. The optical axes of the planoconcave lenses 41, 42 and 43 are aligned with the optical axes 47, 48 and 49, respectively, of the projection cathode-ray tubes 32, 33 and 34. The optical axis 48 of the green-image projection cathode-ray tube 33 is aligned with the optical axis 54 of the front group 51, but the optical axes 47 and 49 of the red-image and blue-image projection cathode-ray tubes 32 and 34 intersect the optical axes 53 and 55 of the front groups 50 and 52 at points 57 and 58, respectively, and are not aligned with the optical axes 53 and 55. The angle between the optical axes 47 and 49 are greater than the angles between the optical axes 53 and 55.

The image focusing of the blue optical system which is arranged as shown in FIG. 4 will be described in detail with reference to FIG. 5. The red optical system is substantially similar to the blue optical system so that it will suffice to explain only the blue optical system. In FIG. 5, for the sake of simplicity, the planoconcave lens 43, the sealed liquid 46 and the face plate 37 are represented by a single planoconcave lens 59. The planoconcave lens 59 produces a virtual image 62 of an image 61 on the flat surface 60 of the planoconcave lens 59 at a position slightly spaced from the flat surface 60. Since the image 61 is perpendicular to the optical axis 49 of the planoconcave lens 59, the virtual image 62 is also perpendicular to the axis 49. The front group 52 produces a real image 63 of the virtual image 62 and the virtual image 62 is inclined at an angle relative to the optical axis 55 of the front group 52 so that the real image 63 is also inclined at an angle relative to the optical axis 55. With the arrangement as shown in FIG. 4, therefore, the image formed on the inner surface of the faceplate 37 is sharply focused over the whole surface of the screen 56.

In FIG. 5, the virtual image 62 is shown as a straight line for the sake of simplicity, but in practice the virtual image is in the form of an arc 64 due to the curvature correction of the image plane of the lens 59. Therefore the positional relationship between the front group 52 and the planoconcave lens 43, or more strictly the point 50 of intersection 58 of the optical axes 55 and 49 of the front group 52 and the planoconcave lens 43, must be taken into consideration. When the concave surface 201 of the planoconcave lens 43 is spherical, it is preferable that the point of intersection 58 coincides with the center of curvature of the spherical surface, but in practice the point of intersection 58 may not coincide with the center of curvature of the spherical surface as far as the real image 63 is formed within the depth of focus of the optical system. As a consequence, even when the concave surface 201 of the planoconcave lens 43 is not spherical, the arrangement as shown in FIG. 4 can project an image having a high quality in practice. Let L denote the distance between the point of intersection 58 and the apex 202 of the concave surface 201 of the planoconcave lens 43, and let r denote the radius of curvature at the apex 202 of the concave surface 201 of the planoconcave lens 43. Then it is preferable that the following relation is satisfied: so that the real image 63 is formed within the depth of focus of the optical system $$0 < L < 5r \qquad (1)$$

If the above-described relation is not satisfied, the right and left portions of the projected image are blurred, so that the projected image is not satisfactory in practice.

Referring back to FIG. 4, the relation between the angles $\theta$ and $\theta'$ will be described when the optical axis 48 of the green-image projection cathode-ray tube 33 is in line with the optical axis 54 of the corresponding front group 51, where $\theta$ is the angle between the optical axis 54 of the front group 51 and each of the optical axes 53 and 55 of the front groups 50 and 52 and $\theta'$ is the angle between the axes 47 and 49 on the one hand and the optical axes 53 and 55 on the other hand, respectively. Then the following relation must be satisfied:

$$\theta' = \theta/m \qquad (2)$$

where m : the projection magnification. It is considered that the value of $\theta'$ obtained from Eq. (2) may be within the range of ±10% in practice.

The projected image can be focused by shifting the front groups 50, 51 and 52 along their optical axes 53, 54 and 55, respectively, forwardly or backwardly.

As described above, when the projection cathode-ray tubes and the projection lens systems are arranged as shown in FIG. 4, the optical axes of the planoconcave lenses 41 and 43 can be aligned with the optical axes 47 and 49, respectively, of the projection cathode-ray tubes 32 and 34 without causing any degradation of focusing capability of the optical system. As a result, all the metal plates 38, 39 and 40 can have parallel surfaces, that is, they can have the same shape. As a result, the system as shown in FIG. 4 can be fabricated at less cost as compared with the system as shown in FIG. 3. Furthermore, one of the objects of the present invention to improve the contrast of the projected image can be attained.

Next a second embodiment of the present invention will be described with reference to FIG. 6. In the second embodiment, a metal plate 66 with a center aperture is securely bonded to the faceplate 65 of a projection cathode-ray tube 64 with an adhesive 67 and a flat glass plate 68 is securely bonded with an adhesive 69 on the metal plate 66. A planoconcave lens 70 is cemented with a transparent adhesive 71 to the flat glass plate 68. A transparent liquid 72 is filled in the closed space defined between the faceplate 65 and the flat glass plate 68.

Further, in a third embodiment of the present invention as shown in FIG. 7, a planoconcave lens 70 is directly bonded with an transparent adhesive 71 to the faceplate 65 of the projection cathode-ray tube 64.

Both the second and third embodiments can improve the contrast of the projected image without causing the increase in fabrication cost and degradation of other optical characteristics.

Next an embodiment of a lens barrel of a projection optical system in accordance with the present invention will be described.

Figure 8:
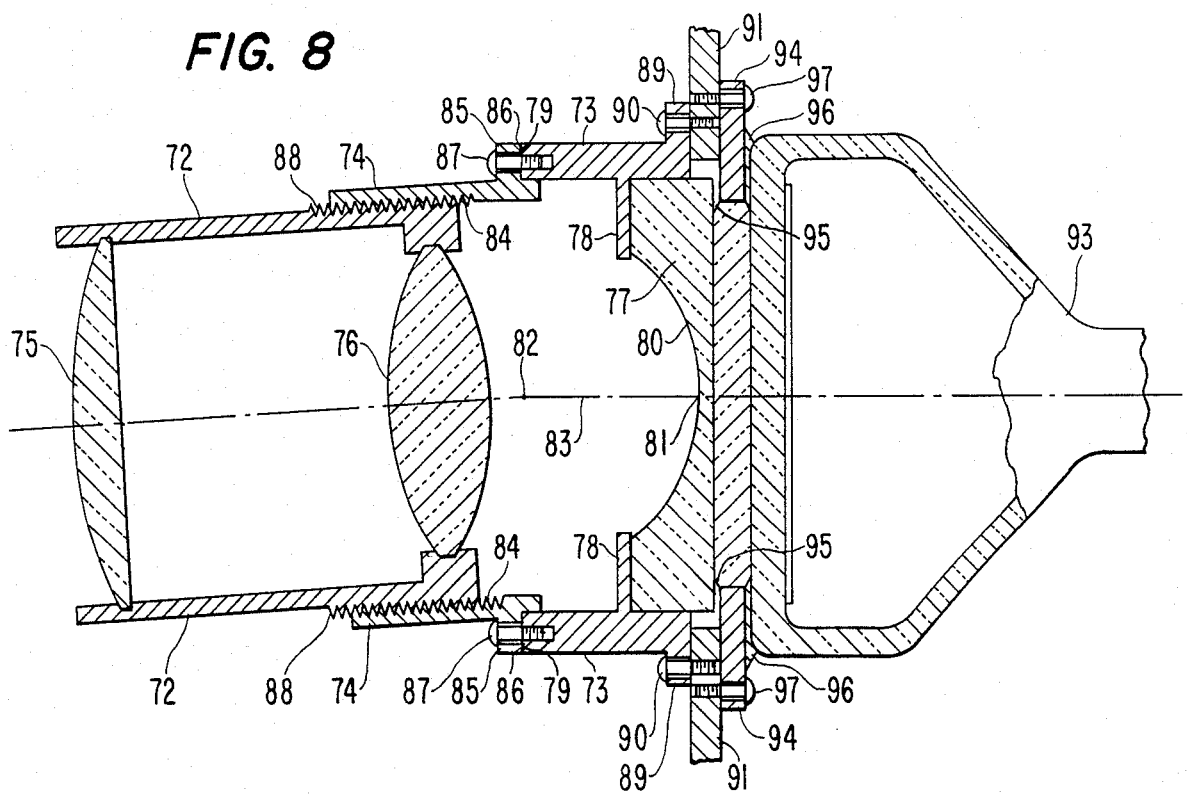
FIG. 8 is a sectional view of a lens barrel of a projection optical system according to the present invention.

FIG. 8 shows a blue optical system including its lens barrel. The lens barrel comprises a front lens barrel 72, a rear lens barrel 73 and a connecting member 74 interconnecting between the front and rear lens elements 72 and 73. The front lens barrel 72 incorporates a front group consisting of a first lens 75 and a second lens 76, and the rear lens barrel 73 incorporates a rear lens element which is a planoconcave lens 77 with its concave surface 80 directed toward the front group. An aperture 78 which also serves to maintain a predetermined position of the third lens 77 is disposed within the rear lens barrel 73. The front end 79 of the rear lens barrel 73 is coplanar with a plane which is perpendicular to the optical axis 83 of the third lens 77 and contains the center of curvature 82 of the apex 81 of the concave surface 80 of the third lens 77. The inner cylindrical surface of the connecting member 74 is formed with screw threads 84 and the connecting member 74 has a flange 85. The rear end of the flange 85 is inclined at a predetermined angle relative to a plane perpendicular to the axis of the threaded portion 84. The flange 85 is securely joined with screws 87 to the rear lens barrel 73. The outer cylindrical surface of the front lens barrel 72 is formed with screw threads 88 adapted to threadably engage with the screw threads 84 of the connecting member 74. The focusing of the optical system can be controlled by rotating the front lens barrel 72 so that the distance between the second and third lenses 76 and 77 is suitably selected. A flange 89 is radially externally extended from the rear end of the rear lens barrel 73 and is securely fixed with screws 90 to a base plate 91. A metal plate 94 with parallel major surfaces is interposed and securely held in position with adhesives 95 and 96 between the third lens 77 and the projection cathode-ray tube 93. After the component parts have been assembled in the manner described above, the third lens 77 is disposed in the rear lens barrel 73 and the metal plate 94 is securely mounted with screws 97 on the base plate 91.

Referring still to FIG. 8, the component parts except the connecting members are all used in common in the red, green and blue optical systems. In the red optical system, the connecting member 74 is rotated through 180° relative to the connecting member 74 in the blue optical system. The connecting member 74 used in the green optical system is such that the rear end 86 of the flange 85 is made in coplanar relationship with a plane perpendicular to the axis of the screw threads 84. Therefore two types of connecting members 74 must be provided, but there is no fabrication problem except that the rear end of the flange of the connecting member is inclined at an angle. Therefore the connecting members can be fabricated from a conventional plastic and at a low cost. When the third lens is assembled, the optical axis of the third lens must be aligned with the optical axis of the projection cathode-ray tube or must be in parallel with the optical axis of the projection cathode-ray tube. To this end, a spacer having parallel major surfaces may be used. Alternatively, the third lens 77 can be directly bonded to the projection cathode-ray tube. In the projection optical system as shown in FIG. 3, a component part whose surfaces are not parallel with each other must be interposed between the rear lens element and the projection cathode-ray tube so that the machining precision and the assembly (including bonding) precision must be taken into consideration. Therefore the fabrication cost is high, but in the case of the embodiment as shown in FIG. 4 or FIG. 8, the common component parts can be used so that the fabrication, assembly and bonding steps can be greatly facilitated. Therefore the fabrication cost becomes low. According to the present invention, the connecting members can be used as described above, but when they are assembled, no adhesive is used. Therefore, as a whole, the fabrication cost can be decreased. From the embodiment shown in FIG. 8, various modifications may be considered. For instance, the rear lens barrel may be formed integral with the connecting member.

Next embodiments of projection lens system adapted for use in the projection optical system in accordance with the present invention will be described.

Figure 9:
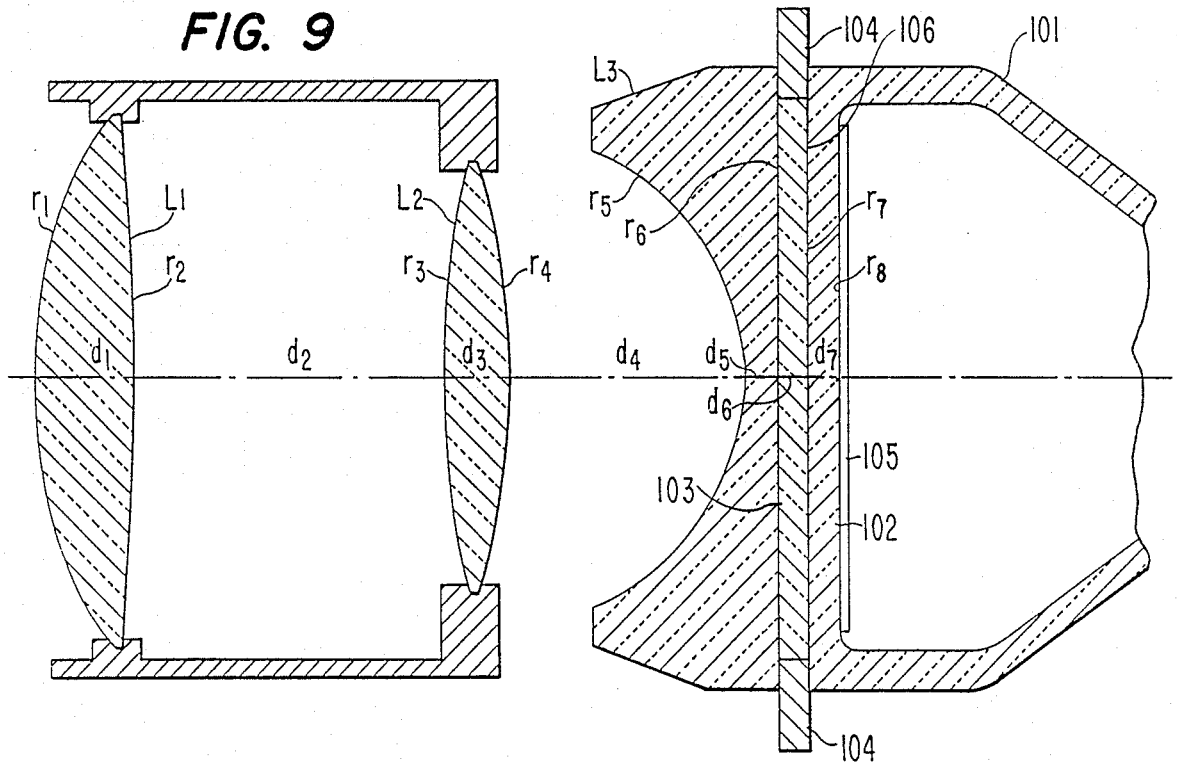
FIG. 9 is a side sectional view of an embodiment of a lens system of a projection optical system according to the present invention.
Figure 12:
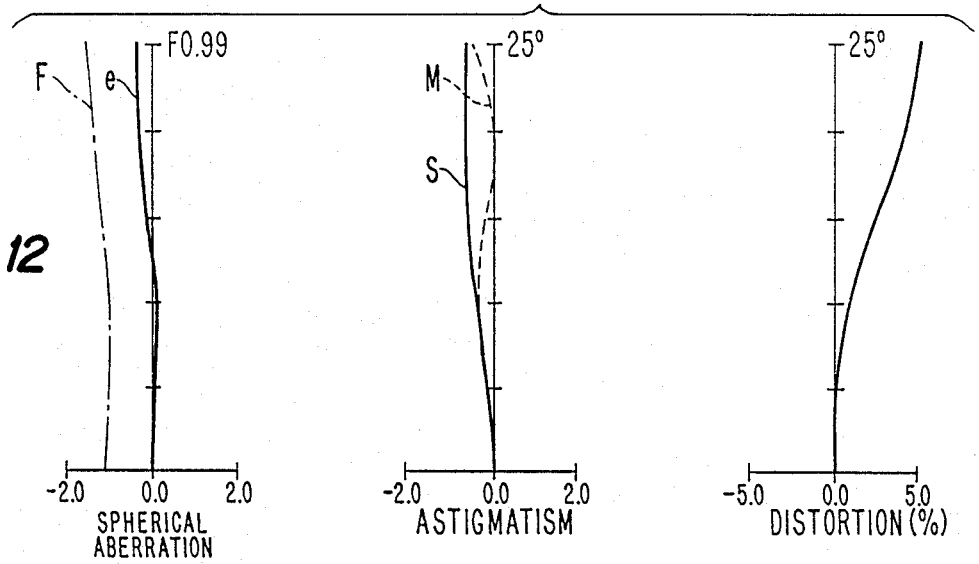
FIGS. 12-20 are aberration diagrams of the first to the ninth embodiments of lens system according to the present invention.
Figure 13:
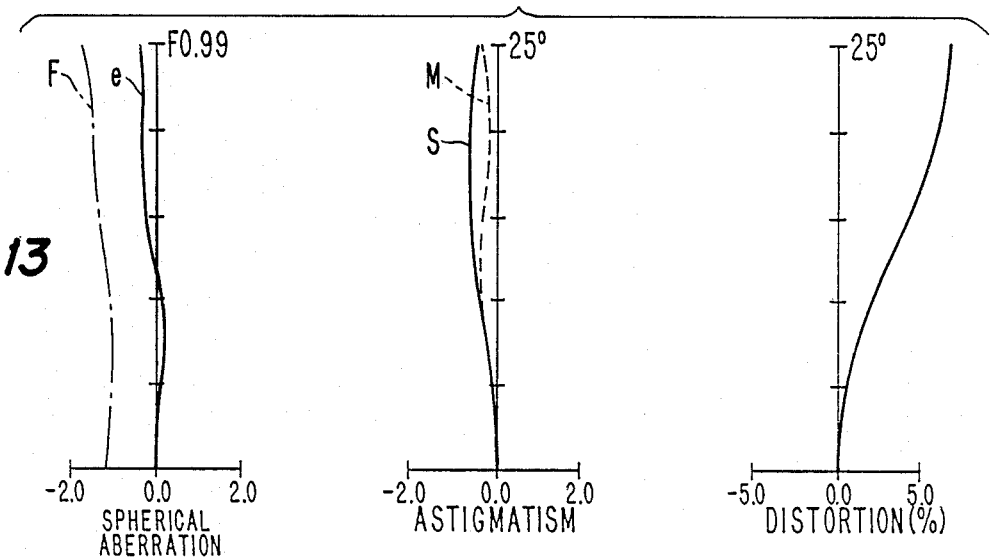
Figure 14:
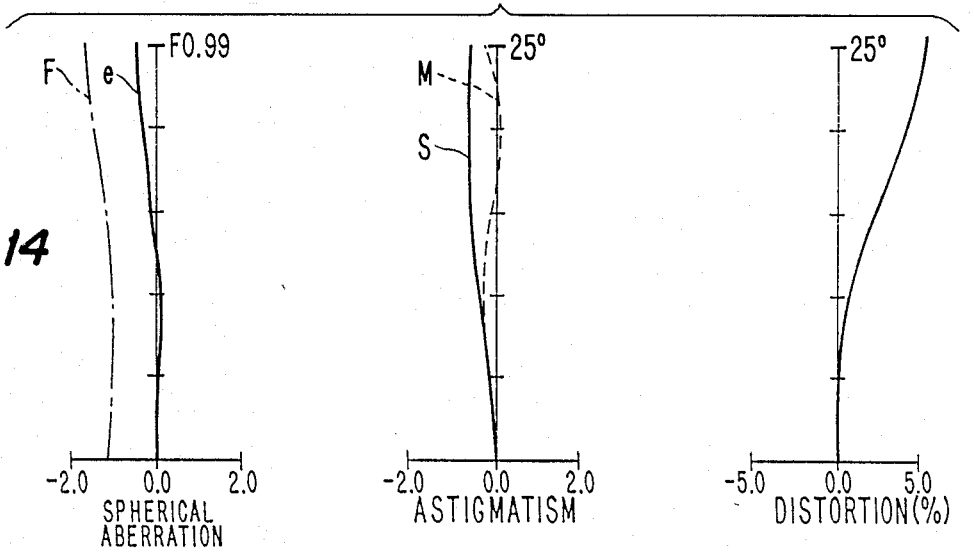
Figure 15:
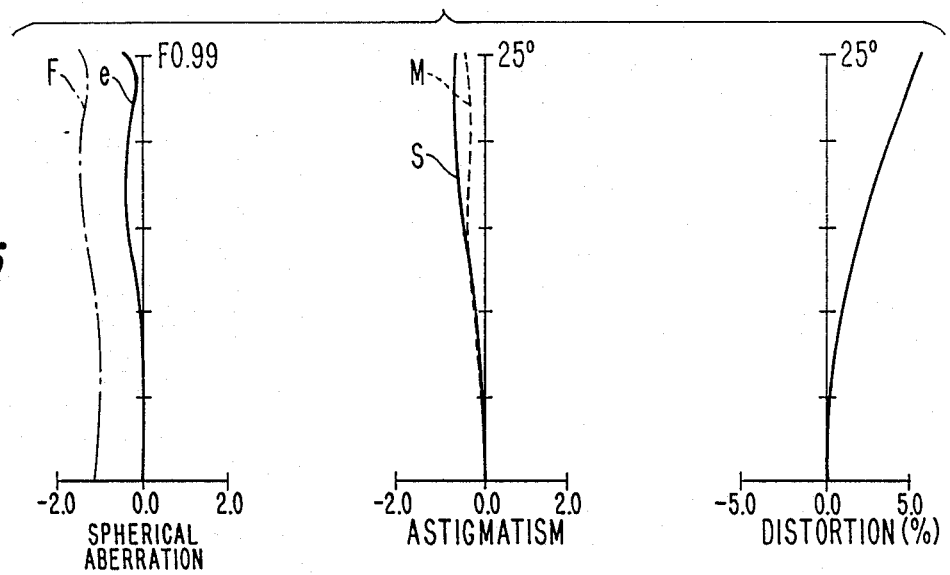
Figure 16:
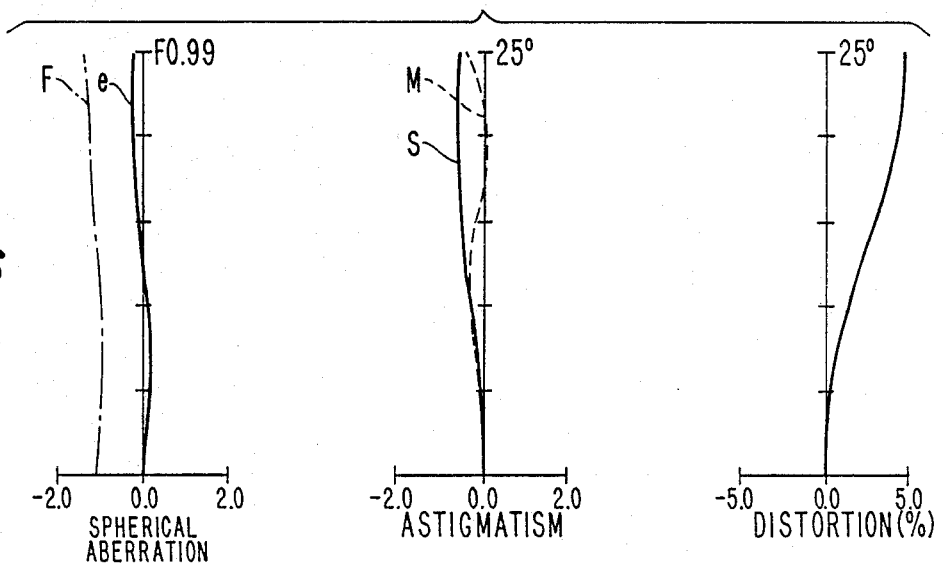
Figure 17:
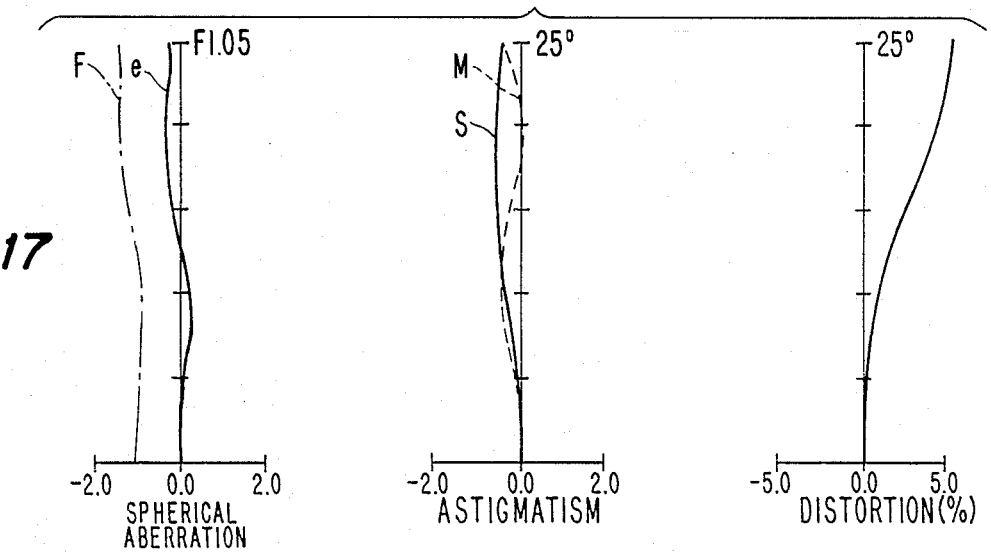
Figure 18:
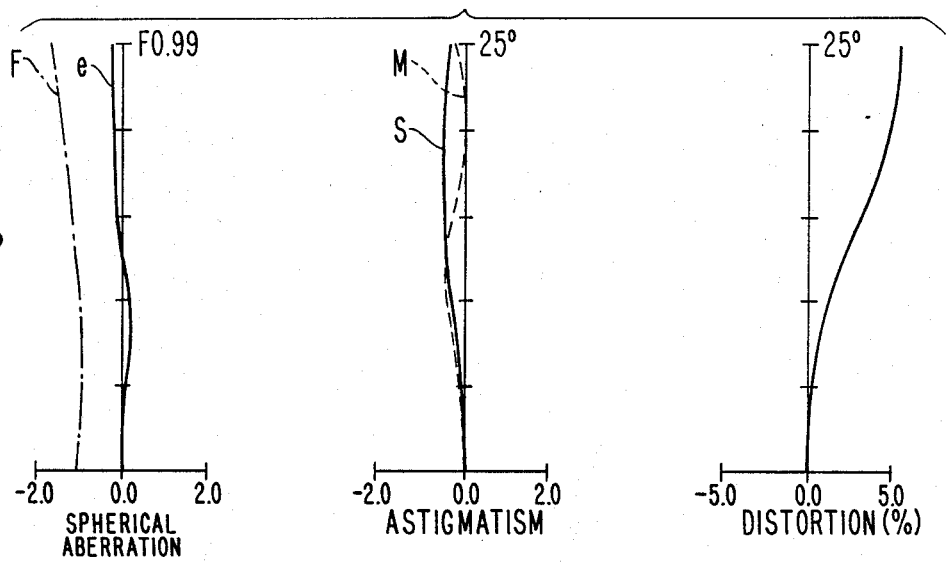
Figure 19:
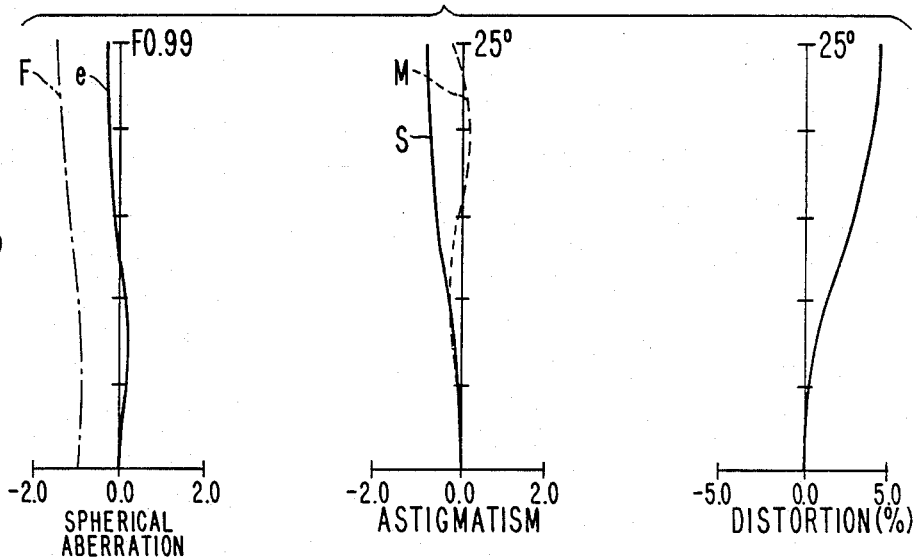
Figure 20:
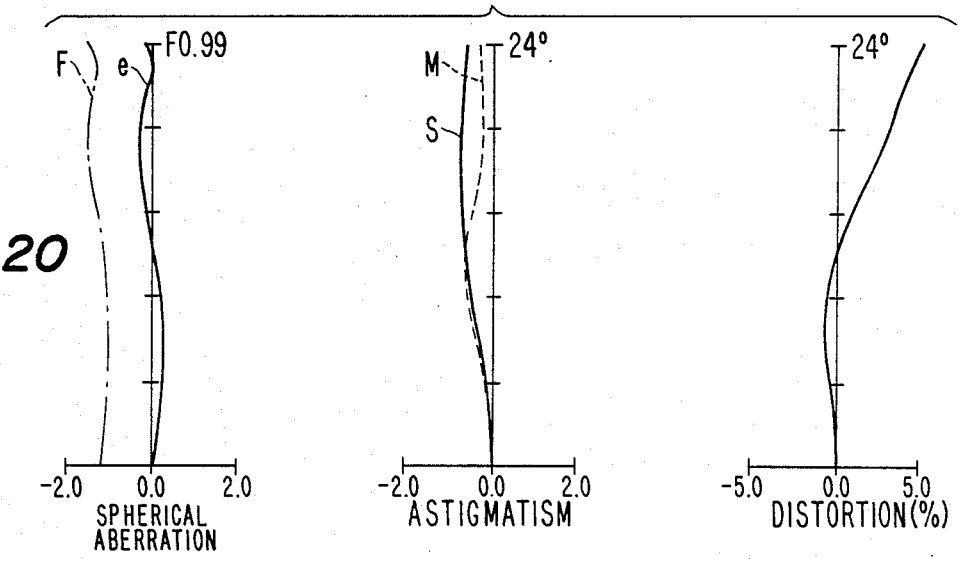

FIG. 9 shows an example of a lens system. The first lens $L_1$ is a plastic lens whose one surface having a greater curvature is directed toward a screen and which has a positive power and has at least one aspherical surface. A second lens $L_2$ is a convexoconvex glass lens and a third lens $L_3$ is a concave lens whose aspheric concave surface is directed toward the screen. The faceplate 102 of a projection cathode-ray tube 101 is disposed behind the third lens $L_3$ and a transparent liquid is filled in a space 103 defined between the third lens $L_3$ and the faceplate 102. The combination of the first and second lens $L_1$ and $L_2$ is a front group and the third lens $L_3$ constitues a rear lens element. A frame 104 is interposed between the third lens $L_3$ and the faceplate 102 so that the distance between the third lens $L_3$ and the faceplate 102 can be maintained at a predetermined value and the transparent liquid can be sealed in the space defined between the third lens $L_3$ and the faceplate 102.

FIG. 9 shows the projection system for projecting a green image. The optical axis of the front group is aligned with that of the rear lens element. In the case of the red or blue optical system, the third lens is inclined at an angle about the center of curvature of the apex of the concave surface of the third lens. In this case, the above-described equation (2) must be satisfied. The projection lens system shown in FIG. 9 may be used in the projection systems as shown in FIG. 4.

In general, the index of refraction of a plastic lens varies over a wide range in response to variations in temperature so that there arises the problem that the projected image is shifted. Therefore the positive power is maintained by a plastic lens and a glass lens so that the shift of the image plane due to the temperature variation is limited within a allowable range in practice. Furthermore, when an aspherical surface is used, the correction of aberrations can be simplified. The faceplate 102 of the projection cathode-ray tube 101 has a convex inner fluorescent surface 105 and a flat outer surface. When the fluorescent screen 105 is convex, the correction of the curvature of the image plane in the lens system is simplified more or less.

The optical projection system of the present invention is not limited to the third planoconcave lens $L_3$ as shown in FIG. 9. For instance, as shown in FIG. 10, the third lens $L_3$ may be a meniscus lens whose concave surface is directed toward a screen. Furthermore as shown in FIG. 11, the third lens $L_3$ may be a planoconcave lens and the flat surface 107 of the lens $L_3$ is bonded with a transparent adhesive to a flat glass plate 108. A transparent liquid 103 is filled into a space 103 defined between the flat glass plate 108 and the faceplate 102. If the index of refraction between the flat glass plate 108 and the faceplate 102 and the sum of the center thickness of the flat glass plate 108 and the faceplate 102 are equal to those of the faceplate 102 shown in FIG. 9, the first lens $L_1$, the second lens $L_2$, the third lens $L_3$, the air spaces therebetween and the center thickness of the transparent body 103 may be substantially equal to those shown in FIG. 9.

The transparent liquid 103 may be a liquid such as ethylene glycol, silicon oil or the like and its index of refraction is between 1.4 and 1.49. When the third lens $L_3$ is made of acrylic plastic, its index of refraction becomes 1.49. The index of refraction of the faceplate 102 is between 1.5 and 1.55. The difference in index of refraction at the boundaries is small so that the reflection at both boundary surfaces of the liquid can be made very small.

The concave surface of the third lens $L_3$ which is directed toward a screen has a greater radius of curvature so that the contrast of the projected image can be improved as described before. In the lens systems as shown in FIGS. 9, 10 and 11, instead of the transparent body 103, a transparent solid material or a transparent adhesive may be used. However, its index of refraction must be very close to those of the third lens $L_3$ and the faceplate 102.

In the optical projection system in accordance with the present invention, unique treatment of distortion is introduced as will be described hereinafter. When a projection cathode-ray tube forms an image only by horizontal and vertical deflections, pincushion distortion results. Therefore positive distortion is produced when the projection cathode-ray tube is viewed from the lens system so that the load on the distortion correction circuit may be decreased. To this end, distortion of the projection cathode-ray tube must satisfy the following conditions:

$$2\% < Ee < 10\%$$

and $$0.2 < Em/Ee < 0.6$$

where
- $Ee(\%)$: distortion at the maximum height of the image as viewed from the projection cathode-ray tube, and
- $Em(\%)$: distortion at 60% of the maximum height of the image.

Furthermore, if the distortion curve is monotonously increased, a relatively simple distortion correction circuit can satisfactorily correct distortion of the projected image in practice. The reason why distortion at 60% of the maximum height of the image is used is that when the ratio between the height and width of the image formed by the projection cathode-ray tube is 3:4, the size of the image in the vertical direction becomes 60% of the diagonal line and that distortions of the projected image are particularly noticeable at the upper and lower end portions thereof.

In order to satisfy the above-described conditions for correcting distortions, in the projection optical system in accordance with the present invention, the power of the second lens $L_2$ is decreased as compared with the conventional projection lens. That is, the first and third lenses $L_1$ and $L_3$ correct the positive distortion while the second lens $L_2$ corrects the negative distortion. When the power of the second lens $L_2$ is small, the negative distortion is less so that the positive distortion becomes greater as a whole.

In order to realize the optical projection system in accordance with the present invention, the following conditions may be satisfied:

(1) $0.45 < f/f_1 < 0.7$
(2) $0.65 < f/f_2 < 0.85$
(3) $-1.3 < f/f_3 < -0.85$ where
- f : the compound focal length of the optical system consisting of the first, second and third lenses $L_1$, $L_2$ and $L_3$, the transparent body 103 and the faceplate 102;
- $f_1$: the focal length of the first lens $L_1$;
- $f_2$: the focal length of the second lens $L_2$; and
- $f_3$: the compound focal length of the third lens $L_3$, the transparent body 103 and the faceplate 102.

The conditions (1) and (2) are needed in order to obtain a suitable positive power distribution. That is, they are required for causing a predetermined distortion, uniformly correcting other aberrations and further limiting within a predetermined value the displacement of the image plane due to the variations in ambient temperature. When the value $f/f_1$ exceeds 0.7, the power of the first lens $L_1$ becomes too great so that it becomes difficult to limit within a tolerable range the shift of the image plane due to variations in ambient temperature. On the other hand, when the value $f/f_1$ is less than 0.45, the power of the second lens $L_2$ must be increased so that the second lens $L_2$ produces excess spherical aberration. As a result, it becomes difficult to correct aberrations on the axis and out of the axis in a well balanced manner. When the value $f/f_2$ exceeds 0.85, the second lens $L_2$ produces excess spherical aberration so that it becomes difficult to correct spherical aberration while supressing aberrations out of axis in other portions. Furthermore it becomes difficult to obtain a predetermined distortion. On the other hand when the value $f/f_2$ is lower than 0.65, the power of the first lens $L_1$ must be increased so that it becomes difficult to limit within a predetermined tolerance the shift of the image plane due to variations in ambient temperature.

The condition (3) is required to correct curvature of field while other aberrations are corrected in a well balanced manner. When the value $f/f_3$ exceeds $-0.85$, it becomes easy to correct curvature of field, but light rays off the axis tend to cause flares. As a result, the quality of the projected image is degraded at the peripheral portions of the screen. On the other hand, if the value $f/f_3$ is lower than $-1.3$, the decrease in Petzval sum is not satisfactory so that it is difficult to satisfactorily correct curvature of field.

Next in order to provide a bright lens with F1.0 the following conditions may be satified:

(4) $0.65 < r_3/|r_4| < 1.6$
(5) $0.4 < d_4/f < 0.7$ where $r_3$ and $r_4$ radii of curvature, respectively, of the surface on the side of the first lens $L_1$ and the opposite surface of the lens $L_2$; and

- $d_4$ : the air space between the second and third lenses $L_2$ and $L_3$.

The condition (4) concerns the radii $r_3$ and $r_4$ of the curvature at the apexes of the second lens $L_2$. When the value $r_3/|r_4|$ is lower than 0.65, it becomes difficult to satisfactorily correct coma over the whole field angle. On the other hand when the value $r_3/|r_4|$ exceeds 1.6, it becomes difficult to correct the light rays passing the periphery of the second lens $L_2$.

The condition (5) concerns the distance $d_4$ of the air space between the second and third lenses $L_2$ and $L_3$. If the value $d_4/f$ is lower than 0.4, the Petzval sum can be satisfactorily decreased, but since the out-of-axis light rays are caused to be incident on the third lens $L_3$ at high positions, it becomes difficult to correct satisfactory the out-of-axis aberration.

When the transparent medium is a liquid in the lens system as shown in FIG. 10, it is preferable to satisfy the following condition:

(6) $r_6 / f < -0.6$ where $r_6$: the radius of curvature of the surface of the third lens $L_3$ on the side of the projection cathode-ray tube.

When the above-described condition (6) is not satisfied, the liquid becomes thicker around the periphery than at the center so that the variation in index of refraction due to variations in ambient temperature cannot be neglected. As a result, the image quality is degraded along the peripheral portions of the projected image.

Next the numerical data of the optical projection systems in accordance with the present invention will be described. $r_j$ represents the radius of curvature at the apex of the j-th surface; $d_j$, the distance of the air space between the j-th surface and the adjacent j+1-th surface; $n_i$, an index of refraction with the e-line of the i-th lens; $\nu_i$ is the Abbe number of the i-th lens; $n_L$, an index of refraction with the e-line of the transparent medium 103; $\nu_L$, the Abbe number thereof; $n_p$, an index of refraction with the e-line of the faceplate 102 of the projection cathode-ray tube; $\nu_{p'}$, the Abbe number thereof; $n'_p$, an index of refraction with the e-line of the flat glass plate 107; and $\nu'_p$ Abbe number thereof. The surface marked with * represents an aspherical surface. When X represents a shift from the apex of a lens at the radius Y of the aperture from the axis of a lens, X is given by $$X = \frac{y^2/r_j}{1 + \sqrt{1 - (1 + K_j)(Y/r_j)^2}} + D_j Y^4 + E_j Y^6 + F_j Y^8 + G_j Y^{10}$$

where $K_j$, $D_j$, $E_j$, $F_j$ and $G_j$ are the coefficients of aspherical surface. $\beta$ represents magnification.

The first to fifth embodiments have the arrangement as shown in FIG. 9 and both the surfaces of the first lens $L_1$ are aspherical. The sixth embodiment has the arrangement as shown in FIG. 9 and the surface of the first lens facing the screen is aspherical. The seventh embodiment has the arrangement as shown in FIG. 9 and the surfaces of the first lens are all aspherical and both the surfaces of the second lens have the same radius of curvature. The eighth embodiment has the arrangement as shown in FIG. 10 and the ninth embodiment has the arrangement as shown in FIG. 11.

(The first embodiment)
$f = 100$, F 0.99, $\beta = -0.140$
$r_1 = 95.758^*$
 $d_1 = 19.24$  $n_1 = 1.494$  $\nu_1 -57.2$
$r_2 = -555.971^*$
 $d_2\ 64.82$
$r_3 = 164.598$
 $d_3 = 13.99$  $n_2 = 1.662$  $\nu_2 = 50.6$
$r_4 = -183.745$
 $d_4 = 49.44$
$r_5 = -44.594^*$
 $d_5 = 3.50$  $n_3 = 1.494$  $\nu_3 = 57.2$
$r_6 = \infty$
 $d_6 = 4.81$  $n_L = 1.40$  $\nu_L = 58$
$r_7 = \infty$
 $d_7 = 9.88$  $n_p = 1.507$  $\nu_p = 50.7$
$r_8 = -2054.807$
Coefficients of aspherical surfaces -continued $K_1 = -6.45282 \times 10^{-1}$   $K_2 = 0.0$
$D_1 = -2.41362 \times 10^{-7}$   $D_2 = -5.72433 \times 10^{-8}$
$E_1 = 4.63542 \times 10^{-11}$   $E_2 = 4.94034 \times 10^{-11}$
$F_1 = -2.32568 \times 10^{-14}$  $F_2 = -1.96549 \times 10^{-14}$
$G_1 = 1.53141 \times 10^{-18}$   $G_2 = 1.69014 \times 10^{-18}$
$K_5 = -5.97814 \times 10^0$
$D_5 = -5.78769 \times 10^{-6}$
$E_5 = 2.07267 \times 10^{-9}$
$F_5 = -6.15447 \times 10^{-13}$
$G_5 = 1.04525 \times 10^{-16}$
$f/f_1 = 0.599$   $f/f_2 = 0.750$
$f/f_3 = -1.079$
(Second embodiment)
$f = 100$, F 0.99, $\beta = -0.142$
$r_1 = 86.679^*$
 $d_1 = 17.80$  $n_1 = 1.494$  $\nu_1 = 57.2$
$r_2 = -3300.094^*$
 $d_2 = 56.57$
$r_3 = 164.967$
 $d_3 = 13.46$  $n_2 = 1.662$  $\nu_2 = 50.6$
$r_4 = -199.638$
 $d_4 = 53.50$
$r_5 = -52.085^*$
 $d_5 = 3.47$  $n_3 = 1.494$  $\nu_3 = 57.2$
$r_6 = \infty$
 $d_6 = 6.85$  $n_L = 1.40$  $\nu_L = 58$
$r_7 = \infty$
 $d_7 = 9.81$  $n_p = 1.507$  $\nu_p = 50.7$
$r_8 = -2040.000$
Coefficients of aspherical surfaces
$K_1 = -4.15551 \times 10^{-1}$   $K_2 = 0.0$
$D_1 = -1.88229 \times 10^{-7}$   $D_2 = 6.49126 \times 10^{-8}$
$E_1 = 4.77615 \times 10^{-11}$   $E_2 = 3.13528 \times 10^{-11}$
$F_1 = -2.42754 \times 10^{-14}$  $F_2 = -1.23574 \times 10^{-14}$
$G_1 = 1.71915 \times 10^{-18}$   $G_2 = 8.45260 \times 10^{-19}$
$K_5 = -3.08905 \times 10^0$
$D_5 = -4.68538 \times 10^{-6}$
$E_5 = 1.43842 \times 10^{-9}$
$F_5 = -6.47043 \times 10^{-13}$
$G_r = 1.64181 \times 10^{-16}$
$f/f_1 = 0.584$   $f/f_2 = 0.722$
$f/f_3 = -0.920$
(Third embodiment)
$f = 100$, F 0.99, $\beta = -0.142$
$r_1 = 94.526^*$
 $d_1 = 19.29$  $n_1 = 1.494$  $\nu_1 = 57.2$
$r_2 = 565.960^*$
 $d_2 = 65.31$
$r_3 = 161.846$
 $d_3 = 14.03$  $n_2 = 1.662$  $\nu_2 = 50.6$
$r_4 = -190.719$
 $d_4 = 49.08$
$r_5 = -44.623^*$
 $d_5 = 3.51$  $n_3 = 1.494$  $\nu_3 = 57.2$
$r_6 = \infty$
 $d_6 = 4.74$  $n_L = 1.40$  $\nu_L = 58$
$r_7 = \infty$
 $d_7 = 9.91$  $n_p = 1.507$  $\nu_p = 50.7$
$r_8 = -2060.953$
Coefficients of aspherical surfaces
$K_1 = -6.07149 \times 10^{-1}$   $K_2 = 0.0$
$D_1 = -2.33232 \times 10^{-7}$   $D_2 = -4.52352 \times 10^{-8}$
$E_1 = 4.65257 \times 10^{-11}$   $E_2 = 4.64427 \times 10^{-11}$
$F_1 = -2.27747 \times 10^{-14}$  $F_2 = -1.93136 \times 10^{-14}$
$G_1 = 1.42096 \times 10^{-18}$   $G_2 = 1.65208 \times 10^{-18}$
$K_5 = -6.91543 \times 10^0$
$D_5 = -6.08408 \times 10^{-6}$
$E_5 = 2.09362 \times 10^{-9}$
$F_5 = -5.55175 \times 10^{-13}$
$G_5 = 8.50045 \times 10^{-17}$
$f/f_1 = 0.604$   $f/f_2 = 0.744$
$f/f_3 = -1.079$
(Fourth embodiment)
$f = 100$, F0.99, $\beta = -0.142$
$r_1 = 103.298^*$
 $d_1 = 17.14$  $n_1 = 1.494$  $\nu_1 = 57.2$
$r_2 = -401.761^*$
 $d_2 = 66.51$
$r_3 = 184.627$
 $d_3 = 13.62$  $n_2 = 1.662$  $\nu_2 = 50.6$
$r_4 = -152.382$
 $d_4 = 48.55$ -continued

| | | |
|---|---|---|
| $r_5 = -41.724*$ | | |
| $d_5 = 3.52$ | $n_3 = 1.494$ | $\nu_3 = 57.2$ |
| $r_6 = \infty$ | | |
| $d_6 = 6.68$ | $n_L = 1.40$ | $\nu_L = 58$ |
| $r_7 = \infty$ | | |
| $d_7 = 9.93$ | $n_p = 1.507$ | $\nu_p = 50.7$ |
| $r_8 = -2065.512$ | | |

Coefficients of aspherical surfaces
$K_1 = -7.99251 \times 10^{-1}$   $K_2 = 0.0$
$D_1 = -2.19610 \times 10^{-7}$   $D_2 = -1.00800 \times 10^{-8}$
$E_1 = 7.16297 \times 10^{-12}$   $E_2 = -1.43379 \times 10^{-11}$
$F_1 = -2.33490 \times 10^{-14}$   $F_2 = -2.54580 \times 10^{-15}$
$G_1 = 5.80384 \times 10^{-18}$   $G_2 = 3.34299 \times 10^{-18}$
$K_5 = -3.38508 \times 10^0$
$D_5 = -4.20336 \times 10^{-6}$
$E_5 = 1.45394 \times 10^{-9}$
$F_5 = -5.41178 \times 10^{-13}$
$G_5 = 9.64214 \times 10^{-17}$
$f/f_1 = 0.594$    $f/f_2 = 0.780$
$f/f_3 = -1.155$ (Fifth embodiment)
$f = 100, F0.99, \beta = -0.142$

| | | |
|---|---|---|
| $r_1 = 90.921*$ | | |
| $d_1 = 19.08$ | $n_1 = 1.494$ | $\nu_1 = 57.2$ |
| $r_2 = -813.559*$ | | |
| $d_2 = 63.02$ | | |
| $r_3 = 139.699$ | | |
| $d_3 = 13.88$ | $n_2 = 1.591$ | $\nu_2 = 61.0$ |
| $r_4 = -187.594$ | | |
| $d_4 = 50.42$ | | |
| $r_5 = -44.236*$ | | |
| $d_5 = 3.47$ | $n_3 = 1.494$ | $\nu_3 = 57.2$ |
| $r_6 = \infty$ | | |
| $d_6 = 4.77$ | $n_L = 1.40$ | $\nu_L = 58$ |
| $r_7 = \infty$ | | |
| $d_7 = 9.80$ | $n_p = 1.507$ | $\nu_p = 50.7$ |
| $r_8 = -2038.307$ | | |

Coefficients of aspherical surfaces
$K_1 = -5.25626 \times 10^{-1}$   $K_2 = 0.0$
$D_1 = -2.24405 \times 10^{-7}$   $D_2 = -2.93590 \times 10^{-8}$
$E_1 = 5.74635 \times 10^{-11}$   $E_2 = 5.73430 \times 10^{-11}$
$F_1 = -2.46801 \times 10^{-14}$   $F_2 = -2.07700 \times 10^{-14}$
$G_1 = 1.51322 \times 10^{-18}$   $G_2 = 1.67919 \times 10^{-18}$
$K_5 = -3.60780 \times 10^0$
$D_5 = -4.72438 \times 10^{-6}$
$E_5 = 1.80837 \times 10^{-9}$
$F_5 = -7.86544 \times 10^{-13}$
$G_5 = 1.76583 \times 10^{-16}$
$f/f_1 = 0.600$    $f/f_2 = 0.727$
$f/f_3 = -1.088$ (Sixth Embodiment)
$f = 100, F1.05, \beta = -0.142$

| | | |
|---|---|---|
| $r_1 = 91.766*$ | | |
| $d_1 = 19.07$ | $n_1 = 1.494$ | $\nu_1 = 57.2$ |
| $r_2 = -673.529$ | | |
| $d_2 = 63.64$ | | |
| $r_3 = 166.857$ | | |
| $d_3 = 13.87$ | $n_2 = 1.662$ | $\nu_2 = 50.6$ |
| $r_4 = -193.161$ | | |
| $d_4 = 49.95$ | | |
| $r_5 = -44.199*$ | | |
| $d_5 = 3.47$ | $n_3 = 1.494$ | $\nu_3 = 57.2$ |
| $r_6 = \infty$ | | |
| $d_6 = 4.77$ | $n_L = 1.40$ | $\nu_L = 58$ |
| $r_7 = \infty$ | | |
| $d_7 = 9.79$ | $n_p = 1.507$ | $\nu_p = 50.7$ |
| $r_8 = -2036.625$ | | |

Coefficients of aspherical surfaces
$K_1 = -5.25860 \times 10^{-1}$   $K_5 = -5.52339 \times 10^0$
$D_1 = -2.22574 \times 10^{-7}$   $D_5 = -5.68908 \times 10^{-6}$
$E_1 = 3.99679 \times 10^{-11}$   $E_5 = 2.07717 \times 10^{-9}$
$F_1 = -2.44869 \times 10^{-14}$   $F_5 = -6.96600 \times 10^{-13}$
$G_1 = 3.09552 \times 10^{-18}$   $G_5 = 1.34247 \times 10^{-16}$
$f/f_1 = 0.606$    $f/f_2 = 0.728$
$f/f_3 = -1.089$ (Seventh embodiment)
$f = 100, F0.99, \beta = -0.142$

| | | |
|---|---|---|
| $r_1 = 97.489*$ | | |
| $d_1 = 16.25$ | $n_1 = 1.494$ | $\nu_1 = 57.2$ |
| $r_2 = -2316.876*$ | | |
| $d_2 = 57.10$ | | |
| $r_3 = 177.545$ | | |
| $d_3 = 14.05$ | $n_2 = 1.662$ | $\nu_2 = 50.6$ |
| $r_4 = -177.545$ | | |
| $d_4 = 61.04$ | | |
| $r_5 = -48.311*$ | | |
| $d_5 = 3.51$ | $n_3 = 1.494$ | $\nu_3 = 57.2$ |
| $r_6 = \infty$ | | |
| $d_6 = 4.12$ | $n_L = 1.40$ | $\nu_L = 58$ |
| $r_7 = \infty$ | | |
| $d_7 = 9.93$ | $n_p = 1.507$ | $\nu_p = 50.7$ |
| $r_8 = -2064.209$ | | | coefficients of aspherical surfaces
$K_1 = -6.30076 \times 10^{-1}$   $K_2 = 0.0$
$D_1 = -2.39607 \times 10^{-7}$   $D_2 = -2.16803 \times 10^{-8}$
$E_1 = 5.84274 \times 10^{-11}$   $E_2 = 6.34962 \times 10^{-11}$
$F_1 = -2.64553 \times 10^{-14}$   $F_2 = -2.28945 \times 10^{-14}$
$G_1 = 4.60514 \times 10^{-19}$   $G_2 = 8.23373 \times 10^{-19}$
$K_5 = -4.77638 \times 10^0$
$D_5 = -5.15458 \times 10^{-6}$
$E_5 = 1.56966 \times 10^{-9}$
$F_5 = -6.05097 \times 10^{-13}$
$G_5 = 1.35551 \times 10^{-16}$
$f/f_1 = 0.527$    $f/f_2 = 0.733$
$f/f_3 = -0.995$ (Eighth embodiment)
$f = 100, F0.99, \beta = -0.140$

| | | |
|---|---|---|
| $r_1 = 91.025*$ | | |
| $d_1 = 19.01$ | $n_1 = 1.494$ | $\nu_1 = 57.2$ |
| $r_2 = -765.802*$ | | |
| $d_2 = 62.62$ | | |
| $r_3 = 161.096$ | | |
| $d_3 = 13.83$ | $n_2 = 1.662$ | $\nu_2 = 50.6$ |
| $r_4 = -197.805$ | | |
| $d_4 = 50.37$ | | |
| $r_5 = -44.078*$ | | |
| $d_5 = 5.19$ | $n_3 = 1.494$ | $\nu_3 = 57.2$ |
| $r_6 = -86.427$ | | |
| $d_6 = 3.02$ | $n_L = 1.40$ | $\nu_L = 58$ |
| $r_7 = \infty$ | | |
| $d_7 = 9.77$ | $n_p = 1.507$ | $\nu_p = 50.7$ |
| $r_8 = -2031.043$ | | |

Coefficients of aspherical surfaces
$K_1 = -5.79979 \times 10^{-1}$   $K_2 = 0.0$
$D_1 = -2.37240 \times 10^{-7}$   $D_2 = -5.00883 \times 10^{-8}$
$E_1 = 5.47455 \times 10^{-11}$   $E_2 = 5.44340 \times 10^{-11}$
$F_1 = -2.59253 \times 10^{-14}$   $F_2 = -2.08555 \times 10^{-14}$
$G_1 = 1.58578 \times 10^{-18}$   $G_2 = 1.56249 \times 10^{-18}$
$K_5 = -3.97953 \times 10^0$
$D_5 = -5.31545 \times 10^{-6}$
$E_5 = 2.11712 \times 10^{-9}$
$F_5 = -7.50059 \times 10^{-13}$
$G_5 = 1.37462 \times 10^{-16}$
$f/f_1 = 0.603$    $f/f_2 = 0.734$
$f/f_3 = -0.979$ (Ninth embodiment)
$f = 100, F0.99, \beta = -0.142$

| | | |
|---|---|---|
| $r_1 = 105.082*$ | | |
| $d_1 = 18.25$ | $n_1 = 1.494$ | $\nu_1 = 57.2$ |
| $r_2 = -368.449*$ | | |
| $d_2 = 63.68$ | | |
| $r_3 = 212.436$ | | |
| $d_3 = 13.80$ | $n_2 = 1.662$ | $\nu_2 = 50.6$ |
| $r_4 = -143.305$ | | |
| $d_4 = 49.91$ | | |
| $r_5 = -39.104*$ | | |
| $d_5 = 3.56$ | $n_3 = 1.494$ | $\nu_3 = 57.2$ |
| $r_6 = \infty$ | | |
| $d_6 = 2.78$ | $n_{p'} = 1.507$ | $\nu'_p = 50.7$ |
| $r_7 = \infty$ | | |
| $d_7 = 6.56$ | $n_L = 1.40$ | $\nu_L = 58$ |
| $r_8 = \infty$ | | |
| $d_8 = 7.28$ | $n_p = 1.507$ | $\nu_p = 50.7$ |
| $r_9 = -2091.731$ | | |

Coefficients of aspherical surfaces
$K_1 = -1.16751 \times 10^0$   $K_2 = 0.0$
$D_1 = -2.52048 \times 10^{-7}$   $D_2 = -5.24989 \times 10^{-8}$
$E_1 = 8.09602 \times 10^{-12}$   $E_2 = -1.52174 \times 10^{-11}$
$F_1 = -2.47335 \times 10^{-14}$   $F_2 = -5.01162 \times 10^{-15}$
$G_1 = 4.37007 \times 10^{-18}$   $G_2 = 2.51704 \times 10^{-18}$
$K_5 = -6.99562 \times 10^0$
$D_5 = -6.05996 \times 10^{-6}$
$E_5 = 1.79790 \times 10^{-9}$
$F_5 = -2.98569 \times 10^{-13}$ -continued $G_5 = -6.63970 \times 10^{-18}$
$f/f_1 = 0.596$  $f/f_2 = 0.761$
$f/f_3 = -1.234$ FIGS. 12-20 show the aberration diagrams of spherical aberation, astigmatism and distortion of the first to ninth embodiments which are viewed from the projection cathode-ray tube. From the numerical data described above and the aberration diagrams, it is understood that the aperture number F is 0.99 so that the projected image is very bright and that the aberrations except distortion are satisfactorily corrected. Distortion is about 5% at the maximum image height and the distortion curves have a very gentle slope or are monotonously increasing curves. Therefore it is apparent that the power supply to the distortion correction circuit of the projection cathode-ray tube can be decreased. The second lens $L_2$ is made of glass and is suitably balanced optically with the first lens $L_1$ so that the shift of the image plane due to variations in ambient temperature can be limited within an allowable range in practice. Furthermore in the cases of the first to ninth embodiments, when the angle between the optical axes of the front group and the rear lens element is less than 2°, the image can be satisfactorily projected and focused on the screen in practice.

What is claimed is:

1. An optical system for projection television apparatus comprising:
    three projection cathode-ray tubes for producing red, green and blue monochrome images, respectively;
    three projection lens systems disposed in front of faceplates of said projection cathode-ray tubes, respectively, for projecting said red, green and blue screen, each of said projection lens systems comprising a rear lens element having a negative power and disposed in front of corresponding one of said cathode-ray tubes and a front group having a positive power and disposed in front of said rear lens element, said rear lens element having a concave surface facing said front group,
    in each of at least two of the three projection lens systems, the optical axis of the front group is tilted to that of the rear lens element, and the optical axis of the rear lens element is in parallel with or aligned with that of corresponding one of the projection cathode-ray tubes.

2. The optical system as set forth in claim 1, wherein the front groups of said three projection lens systems are so arranged that their optical axes intersect with each other at one point.

3. The optical system as set forth in claim 1, wherein the position of the rear lens element of each of said projection lens systems remains unchanged relative to the corresponding projection cathode-ray tube while the front group of each of said projection lens systems is adjustable in position relative to the corresponding projection cathode-ray tube.

4. The optical system as set forth in claim 3, wherein the front group of each of said three projection lens systems is movable forwardly or rearwardly along the optical axis thereof.

5. The optical system as set forth in claim 1, wherein a transparent medium is interposed between the rear lens element of each of said three projection lens systems and the faceplate of the corresponding one of the projection cathode-ray tubes, thereby eliminating an air space therebetween.

6. The optical system as set forth in claim 5, further comprising a spacer for defining a closed space between the rear lens element of each of said three projection lens systems and the corresponding one of the projection cathode-ray tubes, and a transparent liquid filled into said closed space.

7. The optical system as set forth in claim 5, wherein a flat glass plate is bonded with a transparent adhesive to a surface facing the corresponding one of the projection cathode-ray tubes of the rear lens element of each of said three projection lens systems, whereby a closed space is defined between said flat glass plate and said the faceplate of the corresponding projection cathode-ray tube, and a transparent liquid is filled into said closed space.

8. The optical system as set forth in claim 5, wherein the rear lens element of each of said three projection lens systems is bonded with a transparent adhesive to the faceplate of said projection cathode-ray tube.

9. The optical system as set forth in claim 1, wherein the concave surface of the rear lens element of each of said three projection lens systems is aspheric.

10. The optical system as set forth in claim 1, wherein, in each of at least two of said three projection lens systems, the optical axes of the front group and the rear lens element intersect with each other at one point.

11. The optical system as set forth in claim 10, wherein, in said each of at least two of said three projection lens systems, the following condition is satisfied:

$$0 < L < 5r$$

where L is the distance from the point of intersection of the optical axes of the front group and the rear lens element to the apex of the concave surface of said rear lens element, and r is the radius of curvature at the apex of the concave surface of said rear lens element.

12. The optical system as set forth in claim 1, wherein when the angle between the optical axis of the front group and the normal line of a screen is $\theta$, the angle between the optical axes of the front group and rear lens element is $\theta'$ and the projection magnification of said front group is m, the value of $\theta'$ is within +10% higher than the value given by $\theta/m$ and within −10% lower than the value given by $\theta/m$.

* * * * *